(12) United States Patent
Chandrasekaran et al.

(10) Patent No.: US 11,669,774 B2
(45) Date of Patent: Jun. 6, 2023

(54) METHOD AND SYSTEM FOR OPTIMIZING LEARNING MODELS POST-DEPLOYMENT

(71) Applicant: Dell Products L.P., Hopkinton, MA (US)

(72) Inventors: Balasubramanian Chandrasekaran, Round Rock, TX (US); Dharmesh M Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 401 days.

(21) Appl. No.: 16/917,606

(22) Filed: Jun. 30, 2020

(65) Prior Publication Data

US 2021/0406763 A1    Dec. 30, 2021

(51) Int. Cl.
*G06F 21/00* (2013.01)
*G06N 20/00* (2019.01)
(52) U.S. Cl.
CPC .................................. *G06N 20/00* (2019.01)
(58) Field of Classification Search
CPC ...................................................... G06N 20/00
See application file for complete search history.

(56) References Cited

U.S. PATENT DOCUMENTS

| 2014/0325503 | A1* | 10/2014 | Li | G06F 8/61 717/177 |
| 2015/0112915 | A1* | 4/2015 | Michael | G06F 9/5072 706/46 |
| 2016/0160627 | A1* | 6/2016 | Aitken | E21B 44/005 700/90 |
| 2016/0210427 | A1* | 7/2016 | Mynhier | G16H 10/60 |
| 2021/0406763 | A1* | 12/2021 | Chandrasekaran | G06N 20/00 |

FOREIGN PATENT DOCUMENTS

CN    109520071 A    *   3/2019

* cited by examiner

*Primary Examiner* — Mahfuzur Rahman
(74) *Attorney, Agent, or Firm* — Chamberlain, Hrdlicka, White, Williams & Aughtry

(57) ABSTRACT

A method and system for optimizing a learning model post-deployment. Specifically, the disclosed method and system re-optimize—i.e., re-train and/or re-validate—machine learning and/or artificial intelligence algorithms that have already been deployed into a production environment. During post-deployment, the re-optimization process may transpire following the advent of varying model re-adjustment triggers.

18 Claims, 8 Drawing Sheets

METHOD AND SYSTEM FOR OPTIMIZING LEARNING MODELS POST-DEPLOYMENT

BACKGROUND

Traditionally, a supervised machine learning and/or artificial intelligence algorithm may be optimized using any available, yet relevant, training and/or validation data set(s). Following their optimization, the algorithm may be deployed to production.

SUMMARY

In general, in one aspect, the invention relates to a method for optimizing a learning models post-deployment. The method includes deploying, to a client device, a first learning model configured with a first adjusted model state, in response to detecting a model re-adjustment trigger, selecting a second learning model configured with a second adjusted model state, making a first determination that the second learning model outperforms the first learning model, and deploying, based on the first determination and to replace the first learning model, the second learning model to the client device. The method further includes monitoring the second learning model while deployed on the client device, making a second determination, based on monitoring the second learning model, that the first learning model outperforms the second learning model, and re-deploying, based on the second determination and to replace the second learning model, the first learning model to the client device.

In general, in one aspect, the invention relates to a non-transitory computer readable medium (CRM). The non-transitory CRM includes computer readable program code, which when executed by a computer processor, enables the computer processor to deploy, to a client device, a first learning model configured with a first adjusted model state, in response to detecting a model re-adjustment trigger, select a second learning model configured with a second adjusted model state, make a first determination that the second learning model outperforms the first learning model, and deploy, based on the first determination and to replace the first learning model, the second learning model to the client device. The non-transitory CRM further includes computer readable program code, which when executed by the computer processor, further enables the computer processor to monitor the second learning model while deployed on the client device, make a second determination, based on monitoring the second learning model, that the first learning model outperforms the second learning model, and re-deploy, based on the second determination and to replace the second learning model, the first learning model to the client device.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for optimizing learning models post-deployment. Specifically, one or more embodiments of the invention re-optimize—i.e., re-train and/or re-validate—machine learning and/or artificial intelligence algorithms that have already been deployed into a production environment. During post-deployment, the re-optimization process may transpire following the advent of varying model re-adjustment triggers.

Figure 1A:
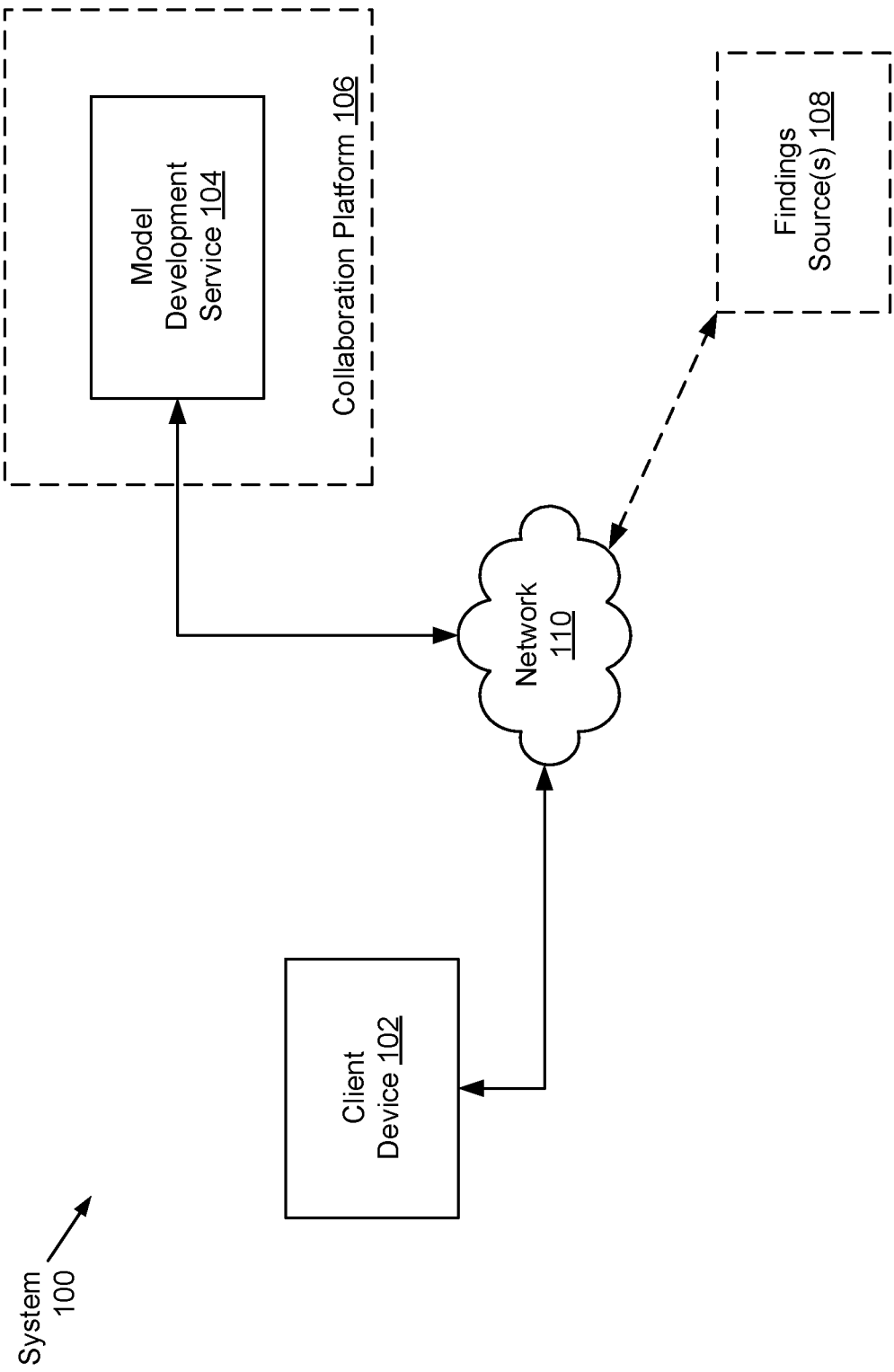
FIG. 1A shows a system in accordance with one or more embodiments of the invention.

FIG. 1A shows a system in accordance with one or more embodiments of the invention. The system (100) may include a client device (102) operatively connected to a model development service (104). The system (100) may or may not further include one or more findings sources (108). Each of these system (100) components is described below.

In one embodiment of the invention, the above-mentioned system (100) components may operatively connect to one another through a network (110) (e.g., a local area network (LAN), a wide area network (WAN) such as the Internet, a mobile network, any other network type, or a combination thereof). The network (110) may be implemented using any combination of wired and/or wireless connections. Further, the network (110) may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, the client device (102) may represent any physical appliance or computing system configured to receive, generate, process, store, and/or transmit data, as well as to provide an environment in which one or more computer programs may execute thereon. The computer program(s) may, for example, implement large-scale and complex data processing; or implement one or more services offered locally or over the network (110). Further, any subset of the computer program(s) may employ or invoke machine learning and/or artificial intelligence to perform their respective functions. In providing an execution environment for the computer program(s) installed thereon, the client device (102) may include and allocate various resources (e.g., computer processors, memory, storage, virtualization, networking, etc.), as needed, to the computer program(s) and the tasks instantiated thereby. In another embodiment of the invention, the client device (102) may be implemented as an edge device. One of ordinary skill will appreciate that the client device (102) may perform other functionalities without departing from the scope of the invention. Examples of the client device (102) may include, but are not limited to, a desktop computer, a workstation computer, a server, a mainframe, or any other computing system similar to the exemplary computing system shown in FIG. 4. The client device (102) is described in further detail below with respect to FIG. 1B.

In one embodiment of the invention, the model development service (104) may represent information technology (IT) infrastructure configured for learning model post-deployment optimization. To that extent, the model development service (104) may include functionality to re-train and/or re-validate learning models (described below), which have already been deployed onto the client device (102). The model development service (104) may be implemented using one or more servers (not shown). Each server may represent a physical or virtual server, which may reside in a datacenter or a cloud computing environment. Additionally or alternatively, the model development service (104) may be implemented using one or more computing systems similar to the exemplary computing system shown in FIG. 4. The model development service (104) is described in further detail below with respect to FIG. 1C.

In one embodiment of the invention, a findings source (108) (if any) may represent any database wherefrom actual findings (described below) may be obtained. A findings source (108) may be implemented using one or more servers (not shown). Each server may represent a physical or virtual server, which may reside in a datacenter or a cloud computing environment. Additionally or alternatively, a findings source (108) may be implemented using one or more computing systems similar to the exemplary computing system shown in FIG. 4.

In one embodiment of the invention, an actual finding may refer to an actual (or real-world) outcome to a task for which a learning model (described below) may be designed and implemented. For example, a learning model, given a set of features (e.g., zip code, number of rooms, school district, number of square feet, etc.), may be optimized to predict house sale prices. Actual findings, pertinent to this learning model, would include actual house sale prices that may be recorded after the properties, for which a prediction was made, had been sold.

In one embodiment of the invention, a learning model may generally refer to a machine learning and/or artificial intelligence algorithm configured for classification, regression, and/or prediction applications. A learning model may further encompass any learning algorithm capable of self-improvement through the processing of sample (e.g., training and/or validation) data. Examples of a learning model may include, but are not limited to, a neural network, a support vector machine, and a decision tree.

While FIG. 1A shows a configuration of components, other system (100) configurations may be used without departing from the scope of the invention. For example, in one embodiment of the invention, the model development service (104) may be implemented as a feature of a larger collaboration platform (106). In such an embodiment, the collaboration platform (106) may represent IT infrastructure configured for collaborative machine learning and/or artificial intelligence software development. The collaboration platform (106) may be implemented using one or more servers (not shown). Each server may represent a physical or virtual server, which may reside in a datacenter or a cloud computing environment. Additionally or alternatively, the collaboration platform (106) may be implemented using one or more computing systems similar to the exemplary computing system shown in FIG. 4. By way of another example, in another embodiment of the invention, the system (100) may further include additional client devices (not shown), which could operatively connect to the model development service (104).

Figure 1B:
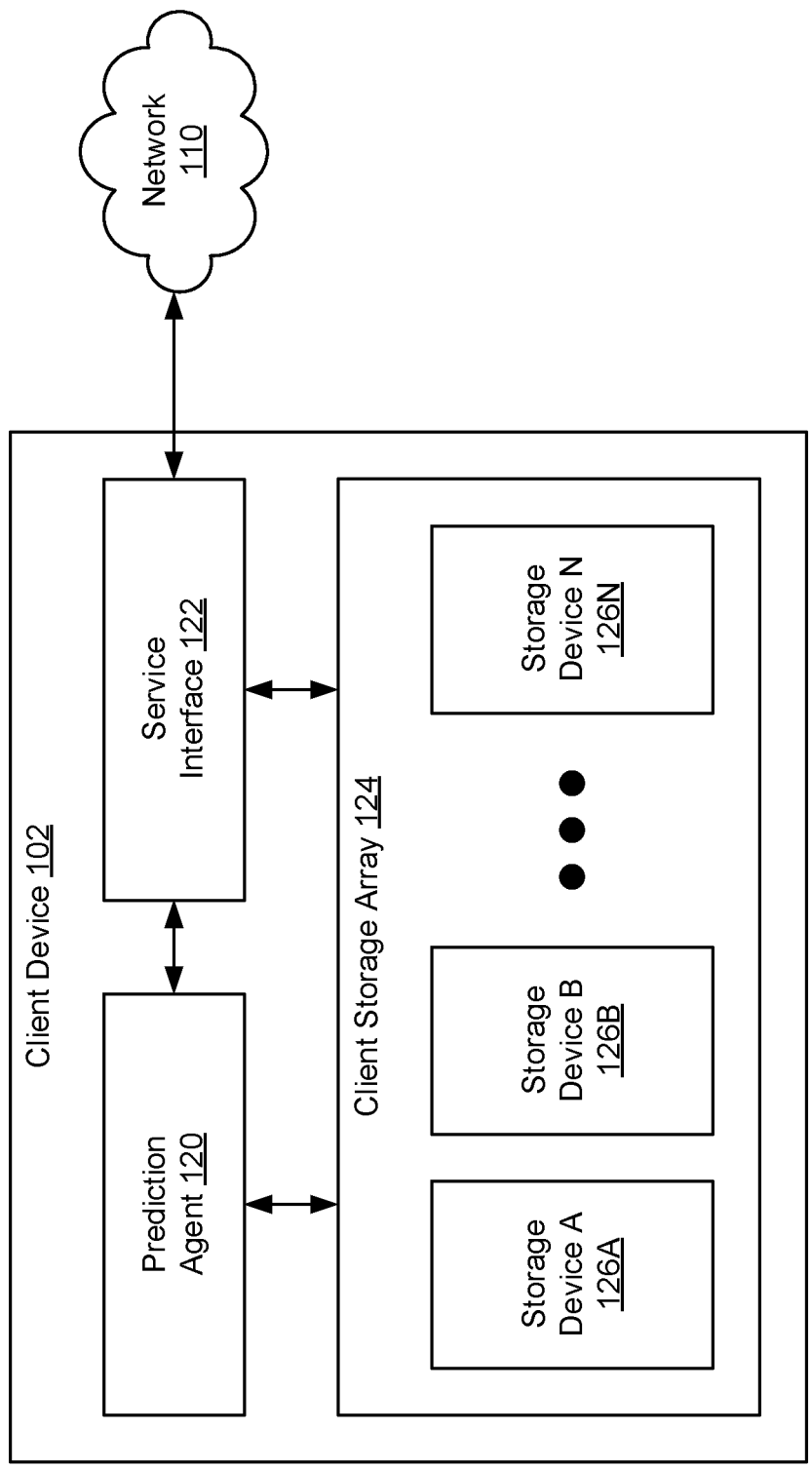
FIG. 1B shows a client device in accordance with one or more embodiments of the invention.

FIG. 1B shows a client device in accordance with one or more embodiments of the invention. The client device (102) may include a prediction agent (120), a service interface (122), and a client storage array (124). Each of these client device (102) subcomponents is described below.

In one embodiment of the invention, the prediction agent (120) may refer to a computer program that may execute on the underlying hardware of the client device (102). Specifically, the prediction agent (120) may be responsible for generating model predictions. A model prediction may refer to an estimated outcome to a task for which a learning model (described above) (see e.g., FIG. 1A) may be designed and implemented—e.g., estimating house sale prices. To that extent, the prediction agent (120) may include functionality to: obtain learning models originating from the model development service (not shown) via the service interface (122); obtain feature values (described below), pertinent to each obtained learning model, from on-demand user input (e.g., via user interfaces, command line interfaces, or any other interface) or the client storage array (124); process the selected feature values using the appropriate learning models to obtain model predictions; generate records (described below) using the selected feature values and obtained model predictions; and maintain the generated records on the client storage array (124) or any other forms of persistent storage off the client device (102) (e.g., remote storage (not shown) operatively connected to at least the client device (102)). The prediction agent (120) may include further functionality to: seek out actual findings (described above) (see e.g., FIG. 1A) pertinent to any obtained learning models; and consolidate the actual findings within appropriate records maintained on the client storage array (124). One of ordinary skill will appreciate that the prediction agent (120) may perform other functionalities without departing from the scope of the invention.

In one embodiment of the invention, a feature value may refer to a quantitative (e.g., numerical) or qualitative (e.g., categorical, ordinal, text, etc.) data value representative of a feature—i.e., a measurable property or indicator—pertinent to the task for which a learning model may be designed and implemented. Following the exemplary task, introduced above, directed to predicting house sale prices, the pertinent features may, for example, include, but are not limited to, zip code, number of rooms, school district, and number of square feet. Feature values, which may collectively describe an individual sample—e.g., a house or property—pertinent to the learning model task, may include: 90210, 8, BHUSD (for Beverly Hills Unified School District), and 20058, respectively.

In one embodiment of the invention, the service interface (122) may refer to networking hardware (e.g., network card or adapter), a logical interface, an interactivity protocol, or any combination thereof, which may be responsible for facilitating communications between the client device (102) and the model development service (not shown) via the network (110). To that extent, the service interface (122) may include functionality to: receive learning models (described above) (see e.g., FIG. 1A) from the model development service; provide the received learning models to the prediction agent (120) for utilization; detect triggers for record batch transfers; in response to detecting the aforementioned triggers, retrieve record batches stored within the client storage array (124); and transmit the retrieved record batches to the model development service. The service interface (122) may include further functionality to: on behalf of the prediction agent (120), submit data inquiries to one or more findings sources (not shown) via the network (110) to retrieve actual findings pertinent to any received learning models; and provide the retrieved actual findings to the prediction agent (120). One of ordinary skill will appreciate that the service interface (122) may perform other functionalities without departing from the scope of the invention.

In one embodiment of the invention, the client storage array (124) may refer to a collection of one or more physical storage devices (126A-126N) on which various forms of data may be consolidated. Data stored therein may include, but is not limited to: collections of feature values (described above) reflective of various samples pertinent to any learning model(s) deployed on the client device (102); and records (described below) generated following the processing of these collections of feature values using the appropriate learning model(s). Each physical storage device (126A-126N) may encompass non-transitory computer readable storage media on which data may be stored in whole or in part, and temporarily or permanently. Further, each physical storage device (126A-126N) may be implemented using any or a combination of storage device technologies—examples of which may include, but are not limited to, flash based storage devices, serial-attached small computer system interface (SCSI) (SAS) based storage devices, and serial advanced technology attachment (SATA) storage devices. Moreover, any subset or all of the client storage array (124) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, a record may represent a data object (e.g., file) or data structure (e.g., vector or array) that specifies various information relevant to a given sample—e.g., house/property—pertinent to a given learning model task—e.g., house sale price prediction. The various information may include, but is not limited to: the one or more feature values reflective of the given sample; and the model prediction obtained through processing of the feature value(s) using the relevant learning model. Further, in one embodiment of the invention, if the prediction agent (120) seeks and is able to obtain actual findings prior to the batch transmission of records to the model development service, then a record may further include the actual finding appropriate to the given sample. In another embodiment of the invention, if the prediction agent (120) is unable to obtain actual findings prior to the aforementioned record batch transmission, then an affected record may still be updated, by a findings aggregator (see e.g., FIG. 2C) with the relevant actual finding, while stored on the model development service. One of ordinary skill will appreciate that a record may include additional or alternative information without departing from the scope of the invention.

While FIG. 1B shows a configuration of subcomponents, other client device (102) configurations may be used without departing from the scope of the invention.

Figure 1C:
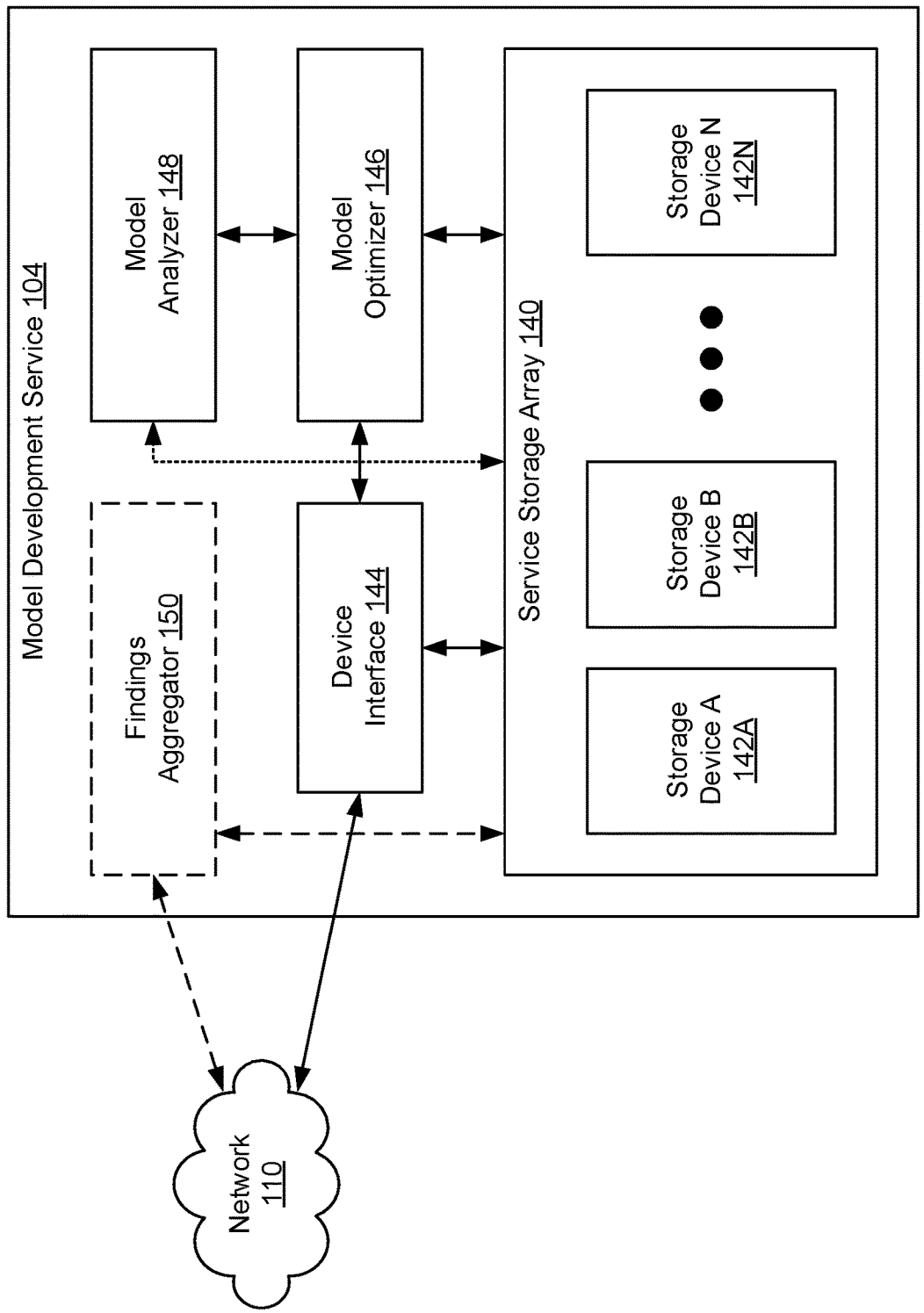
FIG. 1C shows a model development service in accordance with one or more embodiments of the invention.

FIG. 1C shows a model development service in accordance with one or more embodiments of the invention. The model development service (104) may include a service storage array (140), a device interface (144), a model optimizer (146), and a model analyzer (148). The model development service (104) may or may not further include a findings aggregator (150). Each of these model development service (104) subcomponents is described below.

In one embodiment of the invention, the service storage array (140) may refer to a collection of one or more physical storage devices (142A-142N) on which various forms of data may be consolidated. Data stored therein may include, but is not limited to: one or more model states (described below) defining various learning models (described above) (see e.g., FIG. 1A); records aggregated from the client device; tracking information detailing which learning models (configured with which model states) have been deployed to the client device; and performance metrics quantifying the performance (e.g., accuracy) of various learning models configured with varying model states. Each physical storage device (142A-142N) may encompass non-transitory computer readable media on which data may be stored in whole or in part, and temporarily or permanently. Further, each physical storage device (142A-142N) may be implemented using any or a combination of storage device technologies—examples of which may include, but are not limited to, flash based storage devices, serial-attached small computer system interface (SCSI) (SAS) based storage devices, and serial advanced technology attachment (SATA) storage devices. Moreover, any subset or all of the service storage array (140) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, a model state may refer to one or more factors pertinent to the self-improvement (or "learning") of a learning model through experience—e.g., through iterative optimizations using various sample training and/or validation data. The aforementioned factor(s) may differ depending on the design, configuration, and/or operation of the learning model. For a neural network based learning model, for example, the factor(s) may include, but is/are not limited to: weights representative of the connection strengths between pairs of nodes structurally defining the neural network; weight gradients representative of the changes or updates applied to the weights during optimization based on the output error of the neural network; and/or the learning rate defining the speed at which the neural network updates the aforementioned weights and/or weight gradients. Collectively, these factors may also be referred to as model parameters and/or model hyper-parameters.

In one embodiment of the invention, the device interface (144) may refer to networking hardware (e.g., network card or adapter), a logical interface, an interactivity protocol, or any combination thereof, which may be responsible for facilitating communications between the model development service (104) and the client device (not shown) via the network (110). To that extent, the device interface (144) may include functionality to: obtain learning models from the model optimizer (146); deploy the obtained learning models to the client device; receive record batches (i.e., groups of one or more records) from the client device; and store the received record batches on the service storage array (140). One of ordinary skill will appreciate that the device interface (144) may perform other functionalities without departing from the scope of the invention.

In one embodiment of the invention, the model optimizer (146) may refer to a computer program that may execute on the underlying hardware of the model development service (104). Specifically, the model optimizer (146) may be responsible for optimizing (i.e., training and/or validating) learning models. To that extent, the model optimizer (146) may include functionality to: retrieve stored model states from the service storage array (140); initialize learning models using the retrieved model states; select record sets—i.e., sets of two or more stored records—from the service storage array (140); adjust the initialized learning models using the selected record sets, to obtain adjusted learning models configured with adjusted model states; store the adjusted model states on the service storage array (140); and provide the adjusted learning models to the device interface (144) and the model analyzer (148) for deployment and analysis, respectively. One of ordinary skill will appreciate that the model optimizer (146) may perform other functionalities without departing from the scope of the invention.

In one embodiment of the invention, the model analyzer (148) may refer to a computer program that may execute on the underlying hardware of the model development service (104). Specifically, the model analyzer (148) may be responsible for quantifying learning model performance. To that extent, the model analyzer (148) may include functionality to: compute one or more performance metrics (e.g., accuracy, root mean square error, etc.) directed to evaluating the performance of varying learning models configured with varying model states; compare two or more learning models using the computed performance metrics; select better-performing learning models from amongst the compared learning models; and notify the model optimizer (146) of the selected, better-performing learning models. One of ordinary skill will appreciate that the model analyzer (148) may perform other functionalities without departing from the scope of the invention.

In one embodiment of the invention, the findings aggregator (150) may refer to a computer program that may execute on the underlying hardware of the model development service (104). Specifically, the findings aggregator (150) may be responsible for collecting actual findings (described above) (see e.g., FIG. 1A). To that extent, the findings aggregator (150) may include functionality to: seek out and retrieve actual findings from one or more findings sources (not shown) via the network (110); and update the appropriate records, stored on the service storage array (140), using the retrieved actual findings. One of ordinary skill will appreciate that the findings aggregator (150) may perform other functionalities without departing from the scope of the invention.

While FIG. 1C shows a configuration of subcomponents, other model development service (104) configurations may be used without departing from the scope of the invention.

Figure 2:
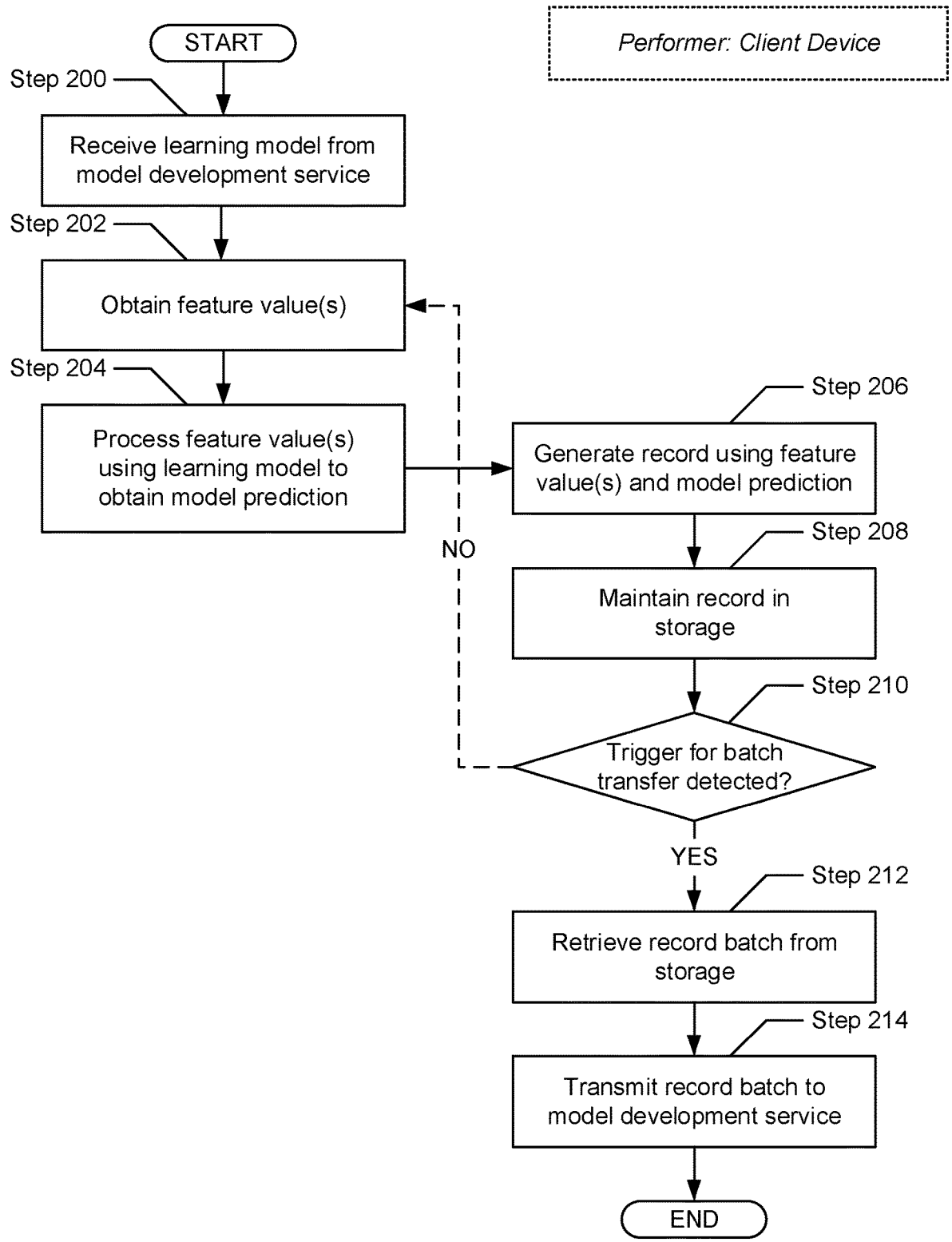
FIG. 2 shows a flowchart describing a method for record generation and transmission in accordance with one or more embodiments of the invention.

FIG. 2 shows a flowchart describing a method for record generation and transmission in accordance with one or more embodiments of the invention. The various steps outlined below may be performed by the client device (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, a learning model (described above) (see e.g., FIG. 1A) is received from the model development service. In one embodiment of the invention, the learning model may be designed to perform a given machine learning and/or artificial intelligence task (e.g., house sale price prediction) pertinent to the user(s) of the client device. Further, the learning model may be configured with an adjusted model state—i.e., a model state (described above) (see e.g., FIG. 1C) adjusted using previously transmitted records (described above) (see e.g., FIG. 1B) relevant to the learning model.

In Step 202, one or more feature values (described above) (see e.g., FIG. 1B) is/are obtained. In one embodiment of the invention, the feature value(s) may be obtained from amongst a collection of feature values stored on the client storage array. In another embodiment of the invention, the feature value(s) may be obtained from an interface wherethrough users may directly submit the feature value(s) as they pertain to a query. Further, the obtained feature value(s) may pertain to an individual sample—e.g., a house or property—relevant to the given machine learning and/or artificial intelligence task of the learning model (received in Step 200).

In Step 204, the feature value(s) (selected in Step 202) is/are processed using the learning model (received in Step 200). In one embodiment of the invention, processing of the feature value(s), by the learning model, may yield a model prediction—e.g., an estimated house/property sale price—for the individual sample.

In Step 206, a record is generated. Specifically, in one embodiment of the invention, the record may be created for the individual sample, which may include, but is not limited to: the feature value(s) (selected in Step 202) and the model prediction (obtained in Step 204). The record may or may not further include an actual finding (described above) (see e.g., FIG. 1A) for the individual sample based on whether the actual finding had been obtained immediately or over a period of time, however, altogether prior to the transmission of the record to the model development service (see e.g., Step 214).

In Step 208, the record (generated in Step 206) is maintained on the client storage array. Thereafter, in Step 210, a determination is made as to whether a batch transfer trigger has been detected. A batch transfer trigger may refer to an event or a met criterion that may cause the transmission of one or more records (generated since a last batch transfer trigger) to the model development service. The aforementioned event or met criterion may, for example, manifest as the periodic elapsing of a specified time interval. Accordingly, in one embodiment of the invention, if it is determined that a batch transfer trigger has been detected, then the process proceeds to Step 212. On the other hand, in another embodiment of the invention, if it is alternatively determined that a batch transfer trigger has not been detected, then the process alternatively proceeds to Step 202, where another set of one or more feature values, representative of another individual sample, may be selected and processed using the learning model (received in Step 200).

In Step 212, following the determination (in Step 210) that a batch transfer trigger had been detected, a record batch is retrieved from the client storage array. In one embodiment of the invention, the record batch (or batch of records) may include one or more records, which had been generated and stored since a previously detected batch transfer trigger. Further, the record batch may include records related to the processing of individual samples using the learning model (received in Step 200) and/or using other learning model(s) deployed on the client device. Subsequently, in Step 214, the record batch (retrieved in Step 212) is transmitted to the model development service.

Figure 3A:
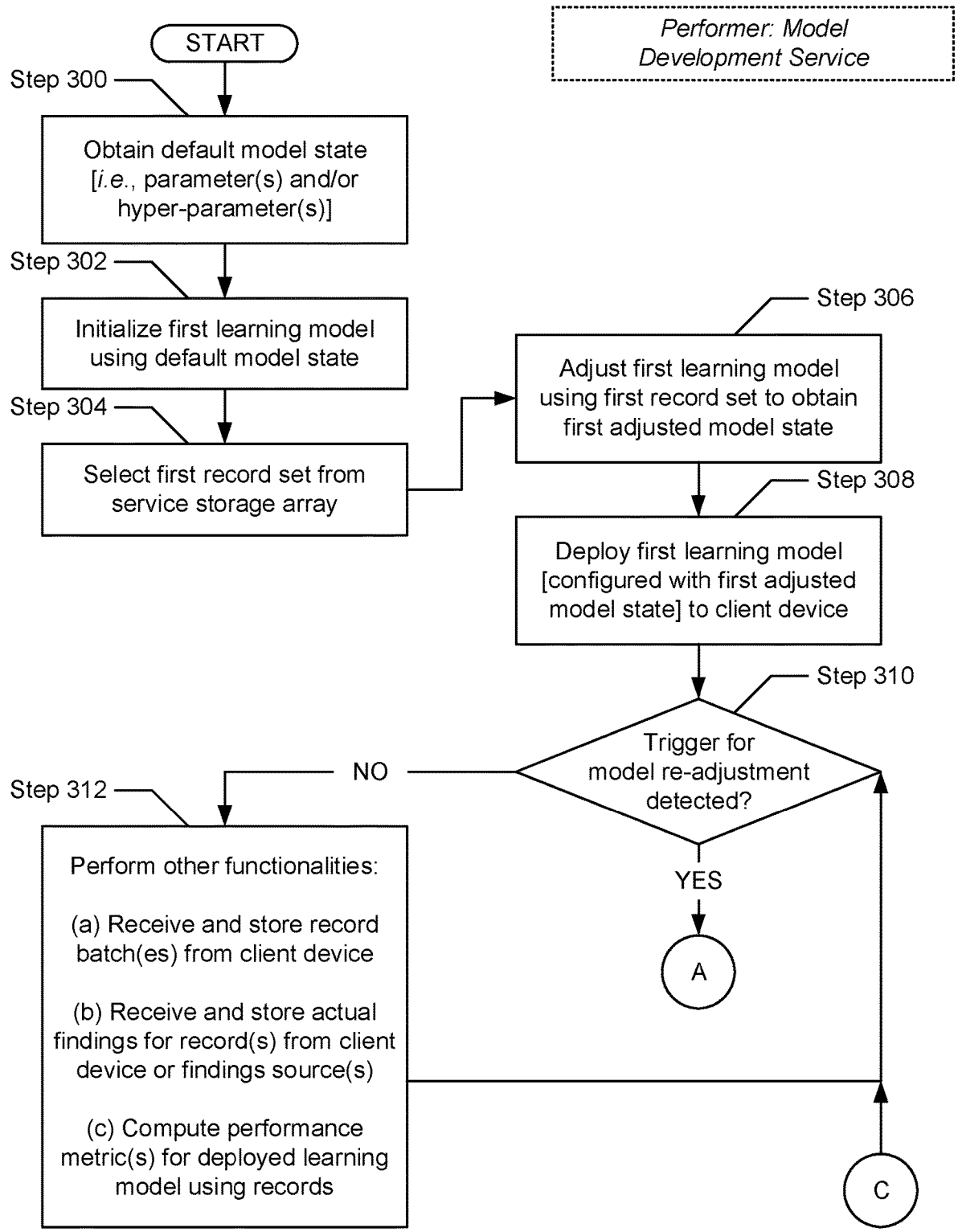
FIGS. 3A-3C show flowcharts describing a method for optimizing learning models post-deployment in accordance with one or more embodiments of the invention.
Figure 3B:
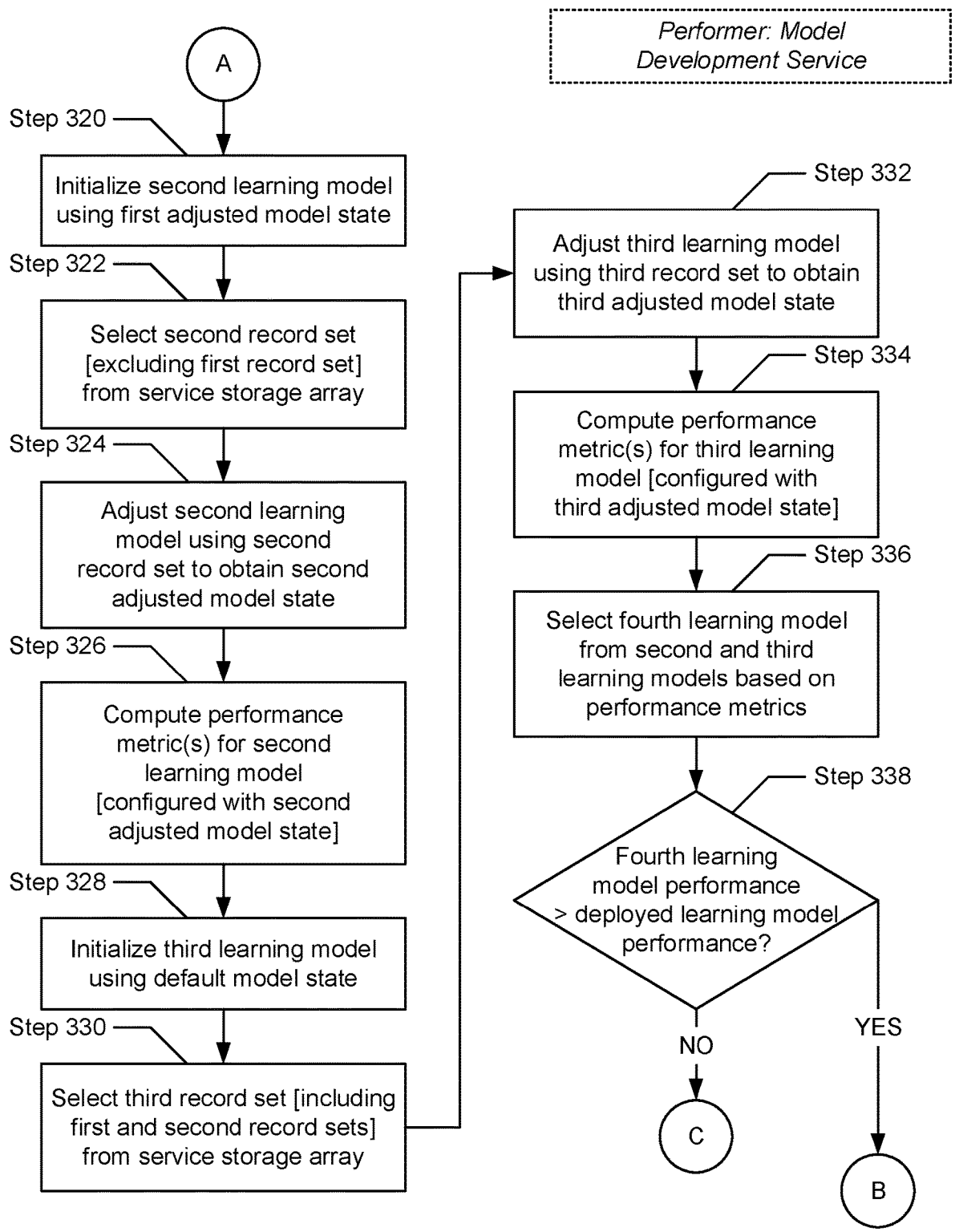
Figure 3C:
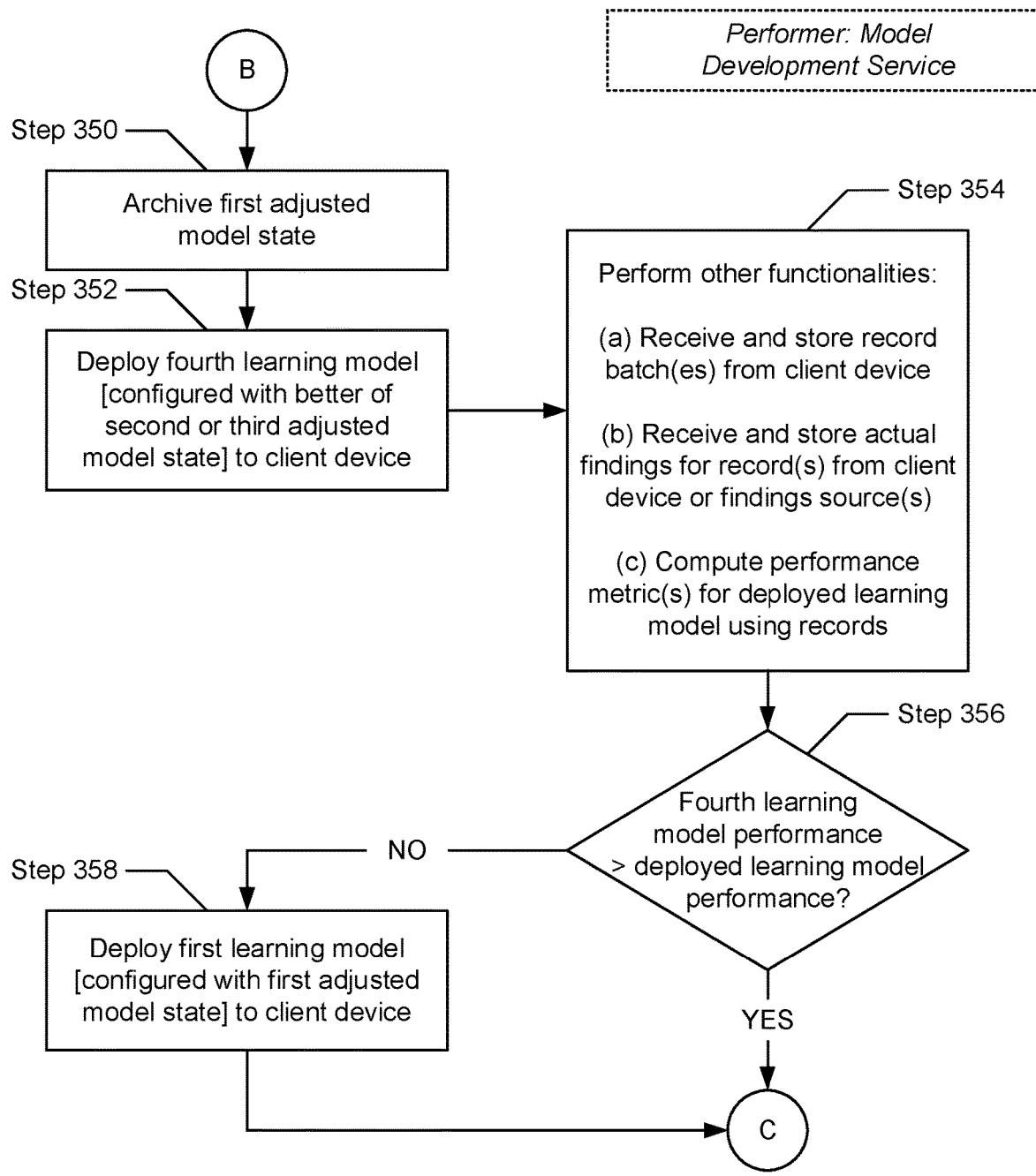

FIGS. 3A-3C show flowcharts describing a method for learning model post-deployment optimization in accordance with one or more embodiments of the invention. The various steps outlined below may be performed by the model development service (see e.g., FIGS. 1A and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 3A, in Step 300, a default model state is obtained. In one embodiment of the invention, the default model state may refer to a model state (described above) (see e.g., FIG. 1C) for a given learning model type, which may have been pre-selected or pre-configured by administrators of the model development service.

In Step 302, a first learning model (described above) (see e.g., FIG. 1A) is initialized using the default model state (obtained in Step 300). That is, in one embodiment of the invention, one or more factors—i.e., model parameters and/or model hyper-parameters, which may define and/or govern the design, configuration, and/or operation of the first learning model—may be initially set to corresponding values specified in the default model state.

In Step 304, a first record set is selected from amongst a collection of records stored in the service storage array. In one embodiment of the invention, each record of the first record set may pertain to an individual sample—e.g., house or property—pertinent to the learning model task—e.g., house/property sale price prediction—of the first learning model (initialized in Step 302). Further, each record of the first record set may at least include: one or more feature values representative of a given individual sample; a model prediction—e.g., an estimated house/property sale price—for the given individual sample; and an actual finding—e.g., an actual house/property sale price—for the given individual sample.

In Step 306, the first learning model (initialized in Step 302) is adjusted using the first record set (selected in Step 304). Specifically, in one embodiment of the invention, the first record set may be partitioned into two subsets—i.e., a first subset of the first record set and a second subset of the first record set. Thereafter, the first learning model may undergo training using the first subset of the first record set (also referred to as a learning model training set), which may result in the adjustment or optimization of one or more learning model parameters. A learning model parameter may refer to a model configuration variable that may be adjusted (or optimized) during a training runtime (or epoch) of the learning model. By way of examples, learning model parameters, pertinent to a neural network based learning model, may include, but are not limited to: the weights representative of the connection strengths between pairs of nodes structurally defining the model; and the weight gradients representative of the changes or updates applied to the weights during optimization based on output error of the neural network.

Following the above-mentioned training stage, the first learning model may subsequently undergo validation using the second subset of the first record set (also referred to as a learning model validation set), which may result in the adjustment or optimization of one or more learning model hyper-parameters. A learning model hyper-parameter may refer to a model configuration variable that may be adjusted (or optimized) before or between training runtimes (or epochs) of the learning model. By way of examples, learning model hyper-parameters, pertinent to a neural network based learning model, may include, but are not limited to: the number of hidden node layers and, accordingly, the number of nodes in each hidden node layer, between the input and output layers of the model; the activation function(s) used by the nodes of the model to translate their respective inputs to their respective outputs; and the learning rate defining the speed at which the neural network updates the weights and/or weight gradients.

In one embodiment of the invention, adjustments to the default model state with which the first learning model had been initially configured (in Step 302), through the above-described manner, may transpire until the learning model training and testing sets are exhausted, a threshold number of training runtimes (or epochs) is reached, or an acceptable performance condition (e.g., threshold accuracy, threshold convergence, etc.) is met. Furthermore, following these adjustments, a first adjusted model state may be obtained, which may represent a model state derived from iterative adjustments applied to the default model state through processing of the first record set.

In Step 308, the first learning model (adjusted in Step 306) is deployed to the client device. In one embodiment of the invention, the first learning model may be deployed while configured with the first adjusted model state (also obtained in Step 306).

In Step 310, a determination is made as to whether a model re-adjustment trigger has been detected. The model re-adjustment trigger may refer to an event or a met criterion that may lead to a re-evaluation of the first learning model (deployed in Step 308). The aforementioned event or met criterion may, for example, manifest as: (a) a number of received new records, generated at the client device through use of the first learning model thereon, that meets and/or exceeds a specified threshold of new records; (b) a time interval, elapsed since deployment of the first learning model, that meets and/or exceeds a specified time interval threshold; or (c) a model performance metric, computed for the first learning model based on received new records, that falls short of a specified performance metric threshold. Accordingly, in one embodiment of the invention, if it is determined that a model re-adjustment trigger had been detected, then the process proceeds to Step 320 (see e.g., FIG. 3B). On the other hand, in another embodiment of the invention, if it is alternatively determined that a model re-adjustment trigger has not been detected, then the process alternatively proceeds to Step 312.

In Step 312, following the determination (in Step 310) that a model re-adjustment trigger has not been detected, one or more other functionalities of the model development service is performed. In one embodiment of the invention, these other functionalities may include, but are not limited to: the receiving and storing of new record batches—each including one or more new records relevant to the use of the first learning model (and/or other deployed learning models)—from the client device; the receiving of actual findings (described above) (see e.g., FIG. 1A) from the client device and/or one or more findings sources, with which at least a subset of the stored records may be updated; and/or the computation of one or more model performance metrics (e.g., accuracy, root mean square error, etc.) for the first learning model (and/or other deployed learning models) using the collection of records, including the first record set and any received new records, stored in the service storage array. Following the performance of one or more of these functionalities over a given period of time, the process then proceeds to Step 310, where another determination may be made as to whether a model re-adjustment trigger has been detected.

Turning to FIG. 3B, in Step 320, following the determination (in Step 310) that a model re-adjustment trigger has been detected, a second learning model is initialized. In one embodiment of the invention, the second learning model may be of the same learning model type (e.g., neural network, support vector machine, decision tree, etc.) of the first learning model (deployed in Step 308). Further, the second learning model may be initialized (or initially configured) with the first adjusted model state (obtained in Step 306). Accordingly, as initially configured, the second learning model may be implemented as a clone of the deployed first learning model.

In Step 322, a second record set is selected from amongst the collection of records stored in the service storage array. In one embodiment of the invention, the second record set may exclude records of the first record set (selected in Step 304). Further, each record of the second record set may pertain to an individual sample—e.g., house or property—pertinent to the learning model task—e.g., house/property sale price prediction—of the first and second learning models. Further, each record of the second record set may at least include: one or more feature values representative of a given individual sample; a model prediction—e.g., an estimated house/property sale price—for the given individual sample; and an actual finding—e.g., an actual house/property sale price—for the given individual sample.

In Step 324, the second learning model (initialized in Step 320) is adjusted using the second record set (selected in Step 322). Specifically, in one embodiment of the invention, the second record set may be partitioned into two subsets—i.e., a first subset of the second record set and a second subset of the second record set. Thereafter, the second learning model may undergo training using the first subset of the second record set (also referred to as a learning model training set), which may result in the adjustment or optimization of one or more learning model parameters (described above). Following the aforementioned training stage, the second learning model may subsequently undergo validation using the second subset of the second record set (also referred to as a learning model validation set), which may result in the adjustment or optimization of one or more learning model hyper-parameters (described above).

In one embodiment of the invention, adjustments to the first adjusted model state with which the second learning model had been initially configured (in Step 320), through the above-described manner, may transpire until the learning model training and testing sets are exhausted, a threshold number of training runtimes (or epochs) is reached, or an acceptable performance condition (e.g., threshold accuracy, threshold convergence, etc.) is met. Furthermore, following these adjustments, a second adjusted model state may be obtained, which may represent a model state derived from iterative adjustments applied to the first adjusted model state through processing of the second record set.

In Step 326, one or more model performance metrics (e.g., accuracy, root mean square error, etc.) is/are computed. In one embodiment of the invention, the computed model performance metric(s) may quantify the performance of the second learning model (adjusted in Step 324), while configured with the second adjusted model state (also obtained in Step 324), to achieve its respective machine learning and/or artificial intelligence task—e.g., house/property sale price prediction. Further, the model performance metric(s) may be derived based on a comparison of, or discrepancies there-between, the model predictions and actual findings within records at least of the second record set (selected in Step 322).

In Step 328, a third learning model is initialized. In one embodiment of the invention, the third learning model may be of the same learning model type (e.g., neural network, support vector machine, decision tree, etc.) of the first and second learning models. Further, the third learning model may be initialized (or initially configured) with the default model state (obtained in Step 300). Accordingly, as initially configured, the third learning model may be implemented as a clone of the first learning model (initialized with the default model state in Step 302).

In Step 330, a third record set is selected from amongst the collection of records stored in the service storage array. In one embodiment of the invention, the third record set may include records of the first record set (selected in Step 304) and the second record set (selected in Step 322). Further, each record of the third record set may pertain to an individual sample—e.g., house or property—pertinent to the learning model task—e.g., house/property sale price prediction—of the first, second, and third learning models. Further, each record of the third record set may at least include: one or more feature values representative of a given individual sample; a model prediction—e.g., an estimated house/property sale price—for the given individual sample; and an actual finding—e.g., an actual house/property sale price—for the given individual sample.

In Step 332, the third learning model (initialized in Step 328) is adjusted using the third record set (selected in Step 330). Specifically, in one embodiment of the invention, the third record set may be partitioned into two subsets—i.e., a first subset of the third record set and a second subset of the third record set. Thereafter, the third learning model may undergo training using the first subset of the third record set (also referred to as a learning model training set), which may result in the adjustment or optimization of one or more learning model parameters (described above). Following the aforementioned training stage, the third learning model may subsequently undergo validation using the second subset of the third record set (also referred to as a learning model validation set), which may result in the adjustment or optimization of one or more learning model hyper-parameters (described above).

In one embodiment of the invention, adjustments to the default model state with which the third learning model had been initially configured (in Step 328), through the above-described manner, may transpire until the learning model training and testing sets are exhausted, a threshold number of training runtimes (or epochs) is reached, or an acceptable performance condition (e.g., threshold accuracy, threshold convergence, etc.) is met. Furthermore, following these adjustments, a third adjusted model state may be obtained, which may represent a model state derived from iterative adjustments applied to the default model state through processing of the third record set.

In Step 334, one or more model performance metrics (e.g., accuracy, root mean square error, etc.) is/are computed. In one embodiment of the invention, the computed model performance metric(s) may quantify the performance of the third learning model (adjusted in Step 332), while configured with the third adjusted model state (also obtained in Step 332), to achieve its respective machine learning and/or artificial intelligence task—e.g., house/property sale price prediction. Further, the model performance metric(s) may be derived based on a comparison of, or discrepancies there-between, the model predictions and actual findings within records at least of the third record set (selected in Step 330).

In Step 336, a fourth learning model is selected from amongst the second learning model (adjusted in Step 324) and the third learning model (adjusted in Step 332). That is, in one embodiment of the invention, the fourth learning model may be selected as the second learning model while configured with the second adjusted model state. In another embodiment of the invention, the fourth learning model may alternatively be selected as the third learning model while configured with the third adjusted model state. Furthermore, in either embodiment, selection of the fourth learning model may depend on a comparison of the model performance metric(s) of the second and third learning models (computed in Step 326 and Step 334). More specifically, the second learning model may be selected if the second learning model is shown to outperform the third learning model, whereas the third learning model may be selected if the third learning model instead outperforms the second learning model.

In Step 338, a determination is made as to whether the fourth learning model (selected from the second and third learning models in Step 336) outperforms the first learning model (deployed in Step 308). The determination may entail a comparison of the model performance metric(s) for the first learning model (computed in Step 312) and for the fourth learning model (either computed in Step 326 or Step 334). Accordingly, in one embodiment of the invention, if it is determined that the fourth learning model outperforms the first learning model, then the process proceeds to Step 350 (see e.g., FIG. 3C). On the other hand, in another embodiment of the invention, if it is alternatively determined that the first learning model outperforms the fourth learning model, then the process alternatively proceeds to Step 310 (see e.g., FIG. 3A), where another model re-adjustment trigger may or may not be detected.

Turning to FIG. 3C, in Step 350, following the determination (in Step 338) that the fourth learning model (selected from the second and third learning models in Step 336) outperformed the first learning model (deployed in Step 308), the first adjusted model state, with which the deployed first learning model may be configured, is archived. That is, in one embodiment of the invention, the first adjusted model state may be stored in the service storage array.

In Step 352, the fourth learning model (selected in Step 336) is deployed to the client device. In one embodiment of the invention, the fourth learning model may be deployed while configured with the second or third adjusted model state (obtained in Step 324 or Step 332, respectively). Further, the fourth learning model may be deployed to replace the first learning model on the client device.

In Step 354, one or more other functionalities of the model development service is performed. In one embodiment of the invention, these other functionalities may include, but are not limited to: the receiving and storing of new record batches—each including one or more new records relevant to the use of the fourth learning model (and/or other deployed learning models)—from the client device; the receiving of actual findings (described above) (see e.g., FIG. 1A) from the client device and/or one or more findings sources, with which at least a subset of the stored records may be updated; and/or the computation of one or more model performance metrics (e.g., accuracy, root mean square error, etc.) for the fourth learning model (and/or other deployed learning models) using the collection of records, including the third record set and any received new records, stored in the service storage array.

In Step 356, following the performance of one or more of above-mentioned functionalities over a given period of time, a determination is made as whether the fourth learning model (deployed in Step 352) still outperforms the first learning model, which had been replaced by the fourth learning model on the client device. The determination may entail a comparison of the model performance metric(s) for the fourth learning model (computed in Step 354) and for the first learning model (computed in Step 312). Accordingly, in one embodiment of the invention, if it is determined that the first learning model now outperforms the fourth learning model, then the process proceeds to Step 358. On the other hand, in another embodiment of the invention, if it is alternatively determined that the fourth learning model still outperforms the first learning model, then the process alternatively ends—i.e., the fourth learning model is retained on the client device.

In Step 358, following the determination (in Step 356) that the first learning model now outperforms the fourth learning model, with which the former had been replaced by the latter (in Step 352), the first learning model is re-deployed to the client device. In one embodiment of the invention, the first learning model may be deployed while configured with the first adjusted model state (archived in Step 350). Further, the first learning model may be deployed to replace the fourth learning model on the client device. From here, the process proceeds to Step 310 (see e.g., FIG. 3A), where another model re-adjustment trigger may or may not be detected.

Figure 4:
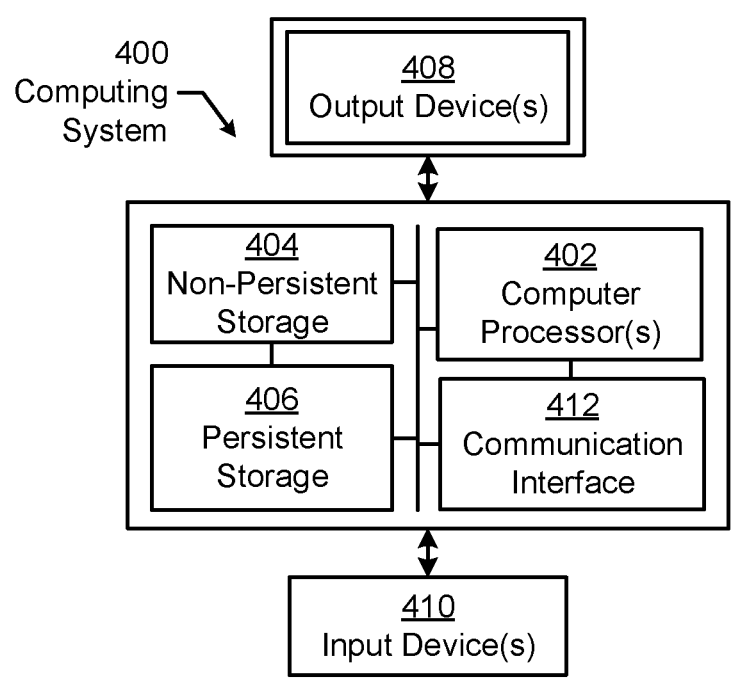
FIG. 4 shows an exemplary computing system in accordance with one or more embodiments of the invention.

FIG. 4 shows an exemplary computing system in accordance with one or more embodiments of the invention. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment of the invention, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for optimizing learning models post-deployment, comprising:
deploying, to a client device, a first learning model configured with a first adjusted model state;
in response to detecting a model re-adjustment trigger:
selecting a second learning model configured with a second adjusted model state;
making a first determination that the second learning model outperforms the first learning model; and
deploying, based on the first determination and to replace the first learning model,
the second learning model to the client device,
wherein the model re-adjustment trigger comprises one selected from a group consisting of receiving at least a threshold of new records pertinent to and since deploying the first learning model, tracking at least a threshold time interval elapsed since deploying the first learning model, and computing a model performance metric for the first learning model since deploying the first learning model, wherein the model performance metric falls short of a threshold model performance metric.

2. The method of claim 1, further comprising:
monitoring the second learning model while deployed on the client device;
making a second determination, based on monitoring the second learning model, that the first learning model outperforms the second learning model; and
re-deploying, based on the second determination and to replace the second learning model,
the first learning model to the client device.

3. The method of claim 1, wherein the first adjusted model state comprises a set of model-specific parameters and hyper-parameters for the first learning model.

4. The method of claim 1, wherein each new record pertinent to the first learning model comprises a set of feature values representing a sample relevant to a learning model task of the first learning model, and a model prediction for the sample obtained through processing of the set of feature values using the first learning model.

5. The method of claim 4, wherein each new record pertinent to the first learning model further comprises an actual finding for the sample.

6. The method of claim 1, further comprising:
prior to deploying the first learning model:
obtaining a default model state;
initializing the first learning model with the default model state; and
adjusting the first learning model using a first record set to obtain the first learning model configured with the first adjusted model state.

7. The method of claim 6, wherein selecting the second learning model, comprises:
initializing the second learning model with the first adjusted model state;
adjusting the second learning model using a second record set to obtain the second learning model configured with the second adjusted model state;
initializing a third learning model with the default model state;
adjusting the third learning model using a third record set to obtain the third learning model configured with a third adjusted model state;
making a second determination that the second learning model outperforms the third learning model; and
selecting the second learning model based on the second determination.

8. The method of claim 7, wherein the second record set excludes the first record set,
wherein the third record set comprises the first and second record sets.

9. The method of claim 6, wherein selecting the second learning model, comprises:
initializing a third learning model with the first adjusted model state;
adjusting the third learning model using a second record set to obtain the third learning model configured with a third adjusted model state;
initializing the second learning model with the default model state;
adjusting the second learning model using a third record set to obtain the second learning model configured with the second adjusted model state;

making a second determination that the second learning model outperforms the third learning model; and selecting the second learning model based on the second determination.

10. A non-transitory computer readable medium (CRM) comprising computer readable program code, which when executed by a computer processor, enables the computer processor to:
- deploy, to a client device, a first learning model configured with a first adjusted model state;
- in response to detecting a model re-adjustment trigger:
  - select a second learning model configured with a second adjusted model state;
  - make a first determination that the second learning model outperforms the first learning model; and
  - deploy, based on the first determination and to replace the first learning model, the second learning model to the client device,
  - wherein the model re-adjustment trigger comprises one selected from a group consisting of receiving at least a threshold of new records pertinent to and since deploying the first learning model, tracking at least a threshold time interval elapsed since deploying the first learning model, and computing a model performance metric for the first learning model since deploying the first learning model, wherein the model performance metric falls short of a threshold model performance metric.

11. The non-transitory CRM of claim 10, comprising computer readable program code,
which when executed by the computer processor, further enables the computer processor to:
- monitor the second learning model while deployed on the client device;
- make a second determination, based on monitoring the second learning model, that the first learning model outperforms the second learning model; and
- re-deploying, based on the second determination and to replace the second learning model,
- the first learning model to the client device.

12. The non-transitory CRM of claim 11, wherein the first adjusted model state comprises a set of model-specific parameters and hyper-parameters for the first learning model.

13. The non-transitory CRM of claim 10, wherein each new record pertinent to the first learning model comprises a set of feature values representing a sample relevant to a learning model task of the first learning model, and a model prediction for the sample obtained through processing of the set of feature values using the first learning model.

14. The non-transitory CRM of claim 13, wherein each new record pertinent to the first learning model further comprises an actual finding for the sample.

15. The non-transitory CRM of claim 10, comprising computer readable program code,
which when executed by the computer processor, further enables the computer processor to:
- prior to deploying the first learning model:
  - obtain a default model state;
  - initialize the first learning model with the default model state; and
  - adjust the first learning model using a first record set to obtain the first learning model configured with the first adjusted model state.

16. The non-transitory CRM of claim 15, comprising computer readable program code to select the second learning model, which when executed by the computer processor, further enables the computer processor to:
- initialize the second learning model with the first adjusted model state;
- adjust the second learning model using a second record set to obtain the second learning model configured with the second adjusted model state;
- initialize a third learning model with the default model state;
- adjust the third learning model using a third record set to obtain the third learning model configured with a third adjusted model state;
- make a second determination that the second learning model outperforms the third learning model; and
- select the second learning model based on the second determination.

17. The non-transitory CRM of claim 16, wherein the second record set excludes the first record set, wherein the third record set comprises the first and second record sets.

18. The non-transitory CRM of claim 15, comprising computer readable program code to select the second learning model, which when executed by the computer processor, further enables the computer processor to:
- initialize a third learning model with the first adjusted model state;
- adjust the third learning model using a second record set to obtain the third learning model configured with a third adjusted model state;
- initialize the second learning model with the default model state;
- adjust the second learning model using a third record set to obtain the second learning model configured with the second adjusted model state;
- make a second determination that the second learning model outperforms the third learning model; and
- select the second learning model based on the second determination.

* * * * *